United States Patent
Stokes

(10) Patent No.: US 10,913,691 B2
(45) Date of Patent: Feb. 9, 2021

(54) EARTHGENUITY COMPOSTING SYSTEM

(71) Applicant: Alexander Joseph Stokes, Topeka, KS (US)

(72) Inventor: Alexander Joseph Stokes, Topeka, KS (US)

( * ) Notice: Subject to any disclaimer, the term of this patent is extended or adjusted under 35 U.S.C. 154(b) by 1 day.

(21) Appl. No.: 16/451,672

(22) Filed: Jun. 25, 2019

(65) Prior Publication Data
US 2020/0407286 A1 Dec. 31, 2020

(51) Int. Cl.
| | | |
|---|---|---|
| C05F 17/907 | (2020.01) | |
| B65F 1/16 | (2006.01) | |
| B65F 1/02 | (2006.01) | |
| B09B 3/00 | (2006.01) | |
| C05F 17/914 | (2020.01) | |
| C05F 17/964 | (2020.01) | |
| B65F 1/14 | (2006.01) | |

(52) U.S. Cl.
CPC .............. *C05F 17/907* (2020.01); *B09B 3/00* (2013.01); *B65F 1/02* (2013.01); *B65F 1/16* (2013.01); *C05F 17/914* (2020.01); *C05F 17/964* (2020.01); *B65F 2001/1489* (2013.01); *B65F 2210/132* (2013.01)

(58) Field of Classification Search
CPC ....... C12M 1/00; C05F 17/907; C05F 17/914; B09B 3/00
USPC .................................................... 435/290.1
See application file for complete search history.

(56) References Cited

U.S. PATENT DOCUMENTS

| | | | |
|---|---|---|---|
| 5,185,261 A * | 2/1993 | Warrington | C05F 17/907 435/290.1 |
| 5,285,534 A * | 2/1994 | Criss | C05F 3/04 4/449 |
| 5,762,225 A * | 6/1998 | Byrd | C05F 17/907 220/6 |
| 7,494,803 B1 * | 2/2009 | Smith | C05F 17/90 435/290.1 |
| 2002/0115199 A1 * | 8/2002 | Thompson | C05F 17/907 435/290.1 |
| 2008/0199951 A1 * | 8/2008 | Uddhaorao | C05F 17/907 435/290.1 |
| 2010/0193534 A1 * | 8/2010 | Roberts | B65F 1/1615 220/810 |
| 2016/0257490 A1 * | 9/2016 | Geisendorfer | B65F 1/1615 |
| 2017/0190508 A1 * | 7/2017 | Mallett | B65F 1/0093 |
| 2018/0072635 A1 * | 3/2018 | Smith | C05F 17/979 |

* cited by examiner

*Primary Examiner* — Nina Bhat

(57) ABSTRACT

The Earthginuity Composting System is an organic waste composting system. It consists of three steps/components. The first step is using a free-standing cylindrical tube that goes in the kitchen. Organic waste goes into the tube. The second step is the Phase 1 Bin. It is a square-shaped plastic bin that sits on raw earth, and it's about thirty three gallons in volume. It has drainage holes at the bottom and two pegs protruding from the front to serve as "anchors" for dumping. The final component is the two Earth Grids. They are three by three feet, sandbox-like squares with NO bottoms and liquid-tight lids. The lack of a bottom to the Earthgrids allows for sitting on raw earth to attract ground bugs/bacteria. The lids have rain holes. You can open, close, and empty the Earth Grids with a Shepherd's Staff (hooked pole).

8 Claims, 4 Drawing Sheets

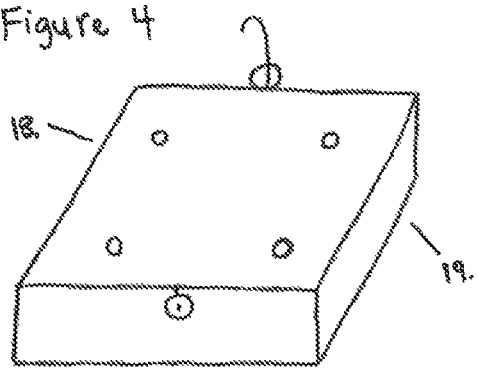
Figure 4
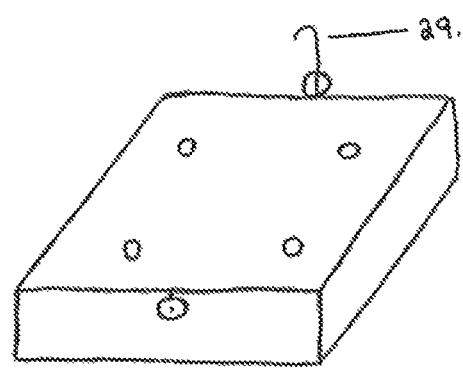
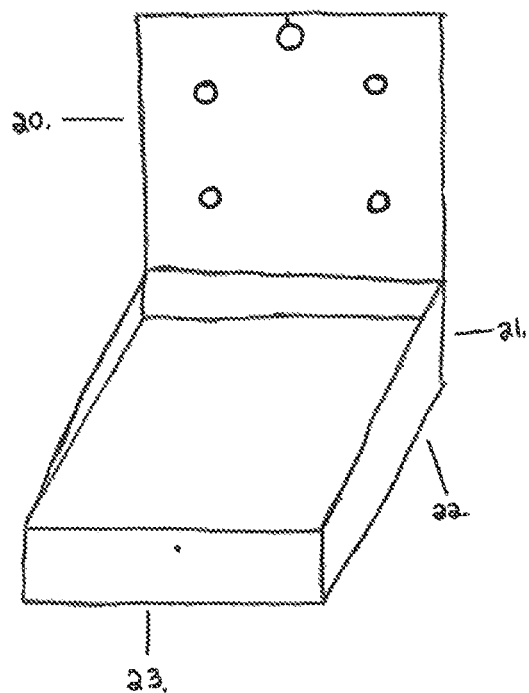
Figure 5
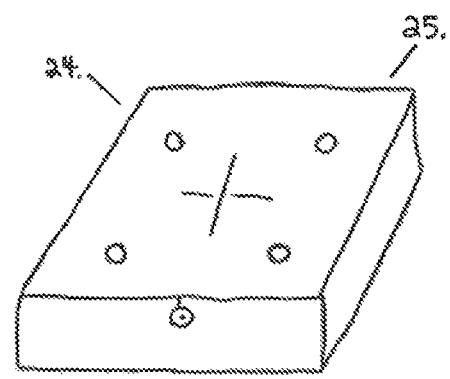
Figure 6
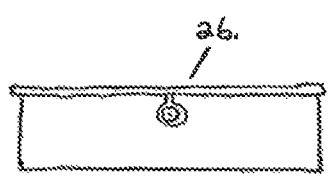
Figure 7
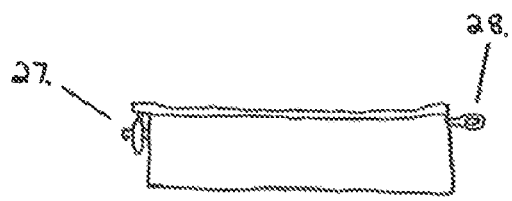
Figure 8

EARTHGENUITY COMPOSTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Filed via EFS-WEB

STATEMENT REGARDING PRIOR DISCLOSURES BY THE INVENTOR OR A JOINT INVENTOR

Not Applicable

FIELD OF THE INVENTION

This invention is of the field of decomposing and composting organic waste. Specifically, it concerns doing so on a residential household and domestic societal level. The invention constitutes both the apparatus and the method of decomposing and composting organic waste.

BACKGROUND OF THE INVENTION

Composting organic material such as food scraps and paper products is a solution towards reducing landfill and yielding optimal ecological homeostasis. Composting can help with the plastic and metal over-production problem, additionally, as separating different kinds of refuse makes managing other types of waste simpler. Many municipalities and state governments offer programs to assist with the separation and disposal of organic waste. Specifically, household organic waste is of particular interest as it has been practiced and proven that households with yards can process and dispose of organic waste independently of municipal programs, private companies, and expensive technological apparatus. The practice of residential households doing this on a large scale has not successfully been realized. This is for two primary reasons.

The first is effort and labor. Household residents do not want to put additional time and money into composting. Residents simply want to throw their garbage away in a single receptacle and not invest further time. In addition, many composting apparatus require labor and time. Some composting apparatus need to have holes dug into the ground. These holes have to continue to be cleaned and maintained, which can be physically taxing. Some composting apparatus have filters that need to be changed and purchased, and even electronic heating devices and fans, all of which require maintenance, money, and time. Even simple composters such as tumblers need to be attended to daily and "turned," and ultimately hauled and dumped to their destination. This makes composting for most home owners laborious and unrealistic.

The second reason residential households do not pragmatically compost organic waste on a large scale is due to the municipal and private programs' lack of effective execution of composting initiatives. It seems counterproductive that fleets of trucks, operated with fossil fuels, would need to be dispatched to do something so simple as separate organic waste from regular refuse. Such fleets of trucks are expensive, and of course, exacerbate the carbon footprint. Additionally, the manpower required of these programs creates a costly infrastructure of employees and their compensation and benefits. All of these components, in turn, produce fees and monetary obligations upon the residents participating in composting.

The purpose, scope, and realistic execution of the invention herein will effectively cancel all of the aforementioned problems. The invention herein is a breakthrough discovery and solution that simplifies composting to its purest, most natural form. Thus, the need for expensive machinery, fleets of personnel and vehicles, and laborious physical time and effort, are consequently unnecessary.

BRIEF SUMMARY OF THE INVENTION

Embodiments herein demonstrate the Earthgenuity Composting System, specifically used for residential households with yards. Earthgenuity System constitutes both apparatus and methodology, however, the apparatus themselves create an inherent and straight forward approach that generally derive a natural methodology. That is not to say methodology or teaching of the system will not be contained herein. This invention as portrayed through the following embodiments is self-functioning and with regards to municipal programs, technology, and personnel, the invention is independently sustainable.

A first embodiment illustrated is the first apparatus involved in the Earthgenuity System. The apparatus is a cylindrical tube which is placed in the kitchen of a household, with said cylindrical tube serving as a receptacle for organic waste, as opposed to regular refuse, and said cylindrical tube exhibiting a distinct shape and size as to distinguish it from regular types of refuse deposit containers. With a volume of approximately two and a half to five gallons, said cylindrical tube is of a convenient size and shape so as to not occupy great space in a kitchen, wherein said cylindrical tube has a strategic volume as to not permit the resident to empty the tube daily. Rather, such a volume would require said resident to empty the tube after three days to three weeks only.

Earthgenuity System constitutes a second apparatus, which is the Phase 1 Bin, which is also the second step in the method of utilizing the system. Upon filling the kitchen tube, the contents of the tube are to be emptied into the Phase 1 Bin. The Phase 1 Bin will be ideally situated near regular garbage cans outdoors for convenience. Said Phase 1 Bin will be 31 to 34 gallons in volume and have a number of drainage holes at the bottom enclosure for fluids to seep out. The drainage holes will require the Phase 1 Bin to be sit upon raw earth, dirt, or grass.

Referenced herein is a final embodiment of a third apparatus, herein called Earth Grids. The Earth Grids are sandbox-like structures, existing always in a set of two; said sandbox-like structures have an opening lid and having no bottoms. They are directly open and resting upon raw earth for to access microbes, insects, and bacteria. The method of using the Earth Grids defines the final step in utilizing the Earthgenuity System. Once the Phase 1 Bin is full with approximately 30 gallons of organic waste, it is emptied into one of the Earth Grids to begin the primary decomposition process. While one Earth Grid is full of decomposing matter, the other Earth Grid will be available for another load to be deposited, thus providing more time for the first Earth Grid to decompose the matter within it.

BRIEF DESCRIPTION OF SEVERAL VIEWS OF THE DRAWINGS

The following embodiments through drawings depict the various apparatus of the Earthgenuity System. The embodiments and their designs reflect the scope and concept of the Earthgenuity System in a simple, pure form, not to be superseded by other embodiments of practically similar design and function.

FIG. 4 shows the two Earth Grids.

FIG. 5 shows an Earth Grid with the lid open.

FIG. 6 shows an Earth Grid with the lid closed, and the four rain holes on the lid, and the downward sloping angle of the lid to capture rainfall.

FIG. 7 shows the front of an Earth Grid and a swinging latch ring in the closed position.

FIG. 8 shows the side of an Earth Grid and a stopper rod catching the swinging latch ring as it is in the closed position.

DETAILED DESCRIPTION OF THE INVENTION

A detailed description of this invention through the following embodiments, drawings, and conceptual representations will provide an understanding to those with amateur skill in the practice of composting of how to utilize the Earthgenuity System. The teaching will be a comprehensive, chronological demonstration of utilizing said invention from start to finish, with specific details relating to the apparatus consisting of three containers involved in the composting system.

Figure 1:
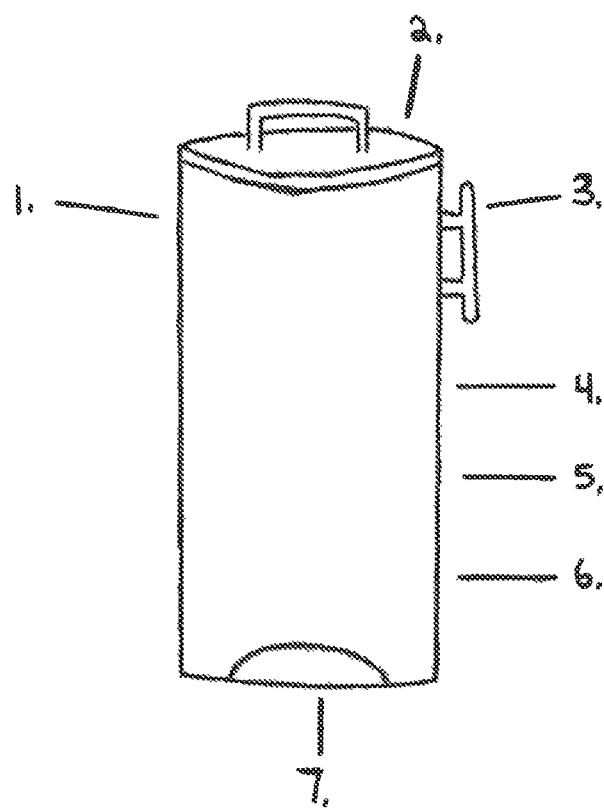
FIG. 1 is the Kitchen Tube and the first step of using the Earthgenuity System.

A residential household with a yard establishes the basis for the domestic practice of the invention being demonstrated. A Kitchen Tube as shown in FIG. 1 will be located in the kitchen of said household. All organic waste generated by said household will be deposited in said Kitchen Tube initially, including paper waste such as paper towels and coffee filters. Said Kitchen Tube is Cylinder Shape 1, has a liquid-tight lid with handle 2, as well as a grab handle 3 near top of shaft, whereby the resident can open and close said tube without flying insects entering, and grab the tube as a whole with the handle 3 on the shaft. Concerning the dimensions of the Kitchen Tube and the space it occupies in the kitchen, said cylindrical tube possesses the following dimensions: Height of cylinder is 23.5" inches tall (may be between 15" and 27" inches tall). Diameter of cylinder is 6" inches (may be between 4" and 13" inches in diameter) 5.

Such a volume will allow for said tube to be emptied every three days to three weeks. The preferred embodiment illustrated in FIG. 1 is made of recycled plastic or PVC 4. Said kitchen tube incorporates: optional version may have foot pedal 7 for hands-free lid opening. The cylindrical shape of said kitchen tube is symbolic and educational in nature, as the distinct cylinder shape represents a receptacle distinct from normal refuse receptacles, wherein said kitchen tube is designated for the purpose of disposing organic materials, and said tube sits in kitchen next to regular garbage bin or convenient location. Organic waste and paper materials go into the tube 6.

Figure 2:
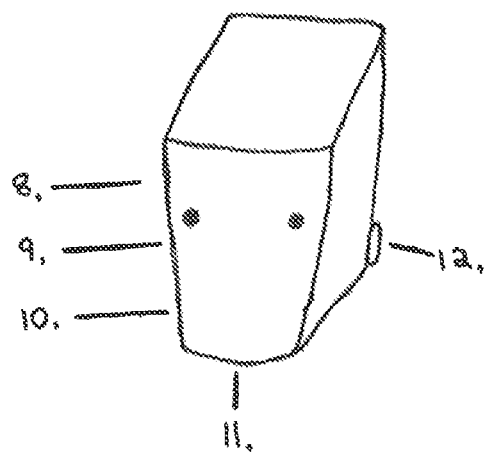
FIG. 2 is the Phase 1 Bin and the second step of the Earthgenuity System.

Upon a family unit of a household filling the aforementioned kitchen tube completely with organic waste, said tube is to be transported to and emptied into the Phase 1 Bin, shown in FIG. 2. The Phase 1 Bin is located and stored next to outdoor/city garbage can. The Phase 1 Bin sits on raw dirt or grass for fluids to drain into ground 10. Just as outside garbage cans for both recyclable refuse and regular refuse are oft stored adjacent to one another, so the method of organizing and grouping the Phase 1 Bin with other outside refuse containers occurs, whereby all refuse types can be taken to the same location outside and simultaneously, if desired. However, as said Phase 1 Bin is meant to stand on raw ground, said Phase 1 Bin incorporates the quality: nine drain holes 11 are equally spaced on the bottom. They are ½" or less in diameter (may be ¼" and up to ½" inch diameter holes). The bottom is flat and flush to the ground. The Phase 1 Bin is made of recycled plastic 8. Said Phase 1 Bin is of such a volume and size as to allow for said kitchen tube to be emptied into said Phase 1 Bin ten to thirty times before the Phase 1 Bin becomes full. The aforementioned drainage holes in said Phase 1 Bin cause the water mass to exit the organic waste into the ground, and thus condense the waste inside the Phase 1 Bin, bringing forth ideal moisture levels and an initial phase of decomposition. The volume and dimensions of said Phase 1 Bin are as follows: thirty one to thirty four gallons of volume. Dimensions: Height–33.5" inches. Depth–19.5" inches. Width–22" inches. (A large Farm Version may be used at approximately fifty gallons) 9. Said Phase 1 Bin has a liquid-tight lid with hinges 14. Said Phase 1 Bin has two wheels 12 on the bottom rear of the bin for easy transport of contents.

The present embodiment discusses a kitchen tube for a family unit of a household to dispose of organic waste; said kitchen tube being ideally placed in the kitchen next to regular refuse container. Said kitchen tube, as previously discussed, is to be emptied into a Phase 1 Bin, a larger container standing on raw earth, and stored outside next to regular large refuse containers. Upon the filling of the Phase 1 Bin through emptying said kitchen tube ten to thirty times, said Phase 1 Bin will be transported to and emptied into an apparatus herein and illustrated as an Earth Grid as shown in FIG. 4.

Figure 3:
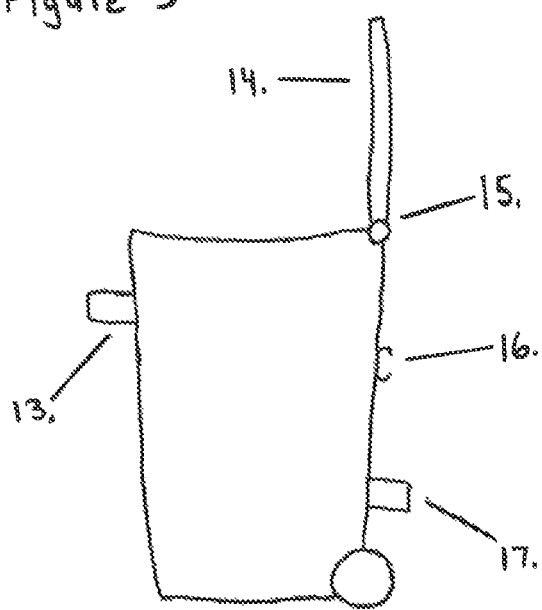
FIG. 3 is a side view of the Phase 1 Bin with the lid open.

A Phase 1 Bin full of organic waste can be transported by grabbing the push and pull handle 15 along full length of hinges as shown in FIG. 3, with means of mobility through two wheels 12 on the bottom rear of the bin for easy transport of contents. The Phase 1 Bin is transported to the two Earth grids, said Earth Grids always existing in a set of two, as shown in FIG. 4, and said Earth Grids ideally situated anywhere in a yard, on grass, next to the garden, or wherever is most convenient. Concerning a critical characteristic of the Earth Grid, there is no bottom 23. Earth Grid sits on raw earth, dirt, or grass to enable worms, ground bugs, and bacteria to access the waste. Further concerning the size and space occupied by each Earth Grid, as shown in FIG. 5 of an Earth Grid with an open lid, the base frame is a three by three feet square 21. Thus, the two Earth grids will occupy an area of only 6×3 feet. Of each of the Earth Grid's size, height of base frame is a minimum of 7.5" inches but may be as tall as 16.5" inches 22. Concerning the area of the lid of each of said Earth Grids, lid is approximately three by three feet, or 37.5" long by 36" inches deep. It is liquid-tight and closes thoroughly over the base 20. Thus, the dimensions yield 4.5 cubic feet of volume per box (per Earth Grid), amounting to about 33.5 gallons 19. As mentioned concerning a distinct characteristic of the Earth Grid, there is no bottom 23.

The method of emptying said Phase 1 Bin into said Earth Grid is straightforward. A resident opens the Earth Grid to commence emptying the Phase 1 Bin. To open the Earth Grid, a swinging latch ring 26 is connected to the lid. It swings forwards and backwards at 180° degrees, as shown in FIG. 7. Opening, closing, and manipulating the Earth Grid does not require bending over. The Shepherd's staff as shown in FIGS. 10-29 and shown in a stored position in FIGS. 4-29 is used to manipulate, open, close, and even empty the Earth Grid. The resident will use the hook at the end of the Shepherd's Staff as seen in FIG. 10 to latch the swinging latch ring 26 shown in FIG. 7 from a standing position. The Shepherd's Staff 29 is between 37" and 45" inches in length, though ideally 41" inches. It is 0.25" inch in diameter (up to ½" in diameter). It is made of stainless steel or aluminum. It has a bend at the end creating a hook. With the lid of the Earth Grid open, you can further utilize the Shepherd's staff to prop the lid up on the other side as seen in FIG. 5. With the lid of said Earth Grid open, a resident can commence emptying the contents of said Phase 1 Bin into the Earth Grid by opening the lid of said Phase 1 Bin and locking it to the rear. As seen in FIG. 3 of the Phase 1 Bin, a semi-circle hook 16 latches onto a small bar on lid to hold it down as the bin is dumped. A resident can begin dumping the Phase 1 Bin into the Earth Grid by pushing the Phase 1 Bin onto the front vertical wall of the Earth Grid (the side of Phase 1 Bin being pushed down is opposite the side of the locked-down lid). As the Phase 1 Bin is shown in FIG. 3, the resident will grab handles 17 to commence dumping. Two, 4" inch-long handles 17 stick out at the rear of the bin (handles may be 4" to 7" inches long), ⅓ of the way up from the bottom of the bin. They are for dumping and tipping the bin over. The resident now holds the handles and lifts to dump the organic waste into the Earth Grid. As seen in FIG. 3, two, 4" inch-long rods/pegs 13 connect at the front and in the top third of the bin (pegs may be 4" to 7" inches long). They serve as anchors when the bin is tipped over the front wall of the earth grid when dumping contents out of the Phase 1 Bin. A resident can now pull the Phase 1 Bin back into the upright position and transfer of the organic waste from the Phase 1 Bin into the Earth Grid is complete. A resident may use the Shepherd's Staff 29 to hook the swinging latch ring 26 on the lid of the Earth Grid and close the Earth Grid. As shown in FIG. 8, a stopper rod 27 protrudes from the top of the base frame wall and points through the middle of the swinging latch ring 26, thus catching or stopping it. The stopper rod is between 1.75" inches long and 2.5" inches long.

With the organic waste inside of the Earth Grid, there are various self-operating and independently functioning features to the Earth Grid, in addition to the insects and bacteria acting upon the decomposing organic waste. Specifically, the capturing of water is important to the Earth Grid's design. As shown in FIG. 6 there are four rain holes 24 on lid to capture rain water. Equally centered in each quarter region. Mesh screening. 1" inch diameter holes (rain holes may be ½" to 2" inches in diameter, Each quarter of the lid 25 tilts down at an 11.25° degree angle leading to the rain hole to pool the rain water (tilting angles leading to holes may be 4° up to 20° degrees). This tilting is occurring surrounding each hole, as seen in the dent-like quarter of the lid 25. The ability to capture rain water provides further moisture as the continual process of water seepage from the waste into the ground decreases both the mass and moisture levels, but gets replenished by the rain water for a moisture balance to occur.

As Earth Grids exist is sets of two, as one Earth Grid is full, the other Earth Grid can be used. Thus, this switching process provides more time for the originally used Earth Grid to decompose the waste inside of it. This doubles the time provided for organic matter to decompose.

Figure 9:
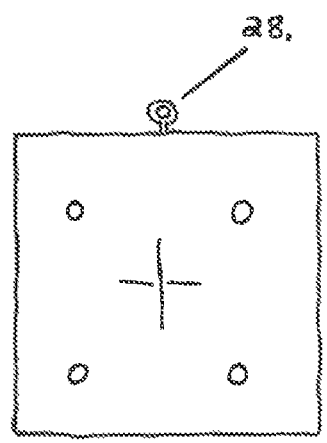
FIG. 9 is a top-down view of an Earth Grid and a top-down view of the Earth Separation Hook attached at the rear of the Earth Grid.
Figure 10:
FIG. 10 is a Shepherd's Staff, a cane-shaped staff with a grappling hook at the end.

When an Earth Grid is ultimately needed to be emptied itself, the Shepherd's Staff may be used to grab a ring hook 28 as shown in FIG. 9, a top view of the Earth Grid. A ring hook 28 sticks out from the rear of the Earth Grid, towards the top of the base's vertical wall. It is called the Earth Separation Hook. It is 1" inch in diameter. Hooking the Earth Separation Hook 28 with the Shepherd's Staff seen in FIG. 10, one may entirely lift off the ground the whole Earth Grid unit and stand it upon its face, whereby the term Earth Separation Hook is given, as the Earth Grid is mostly separated from the Earth and the organic waste within it is exposed and may be raked out. Note that lifting the Earth Grid up on its face and raking the organic matter out does not require bending over. The Earth Grid can be dropped to its proper position using the Shepherd's staff of FIG. 10 to grab the Earth Separation Hook 28 and pulling it back down.

The Shepherd's Staff of FIG. 10 has multiple uses in the manipulation and safety positioning of the Earth Grid. The Shepherd's staff 29 is between 37" and 45" inches in length, though ideally 41" inches. It is 0.25" inch in diameter (up to ½" in diameter). It is made of stainless steel or aluminum. It has a bend at the end creating a hook. The Shepherd's Staff anchors the Earth Grid into the ground by resting through the Earth Separation Hook and continuing into the ground (FIG. 4-29). The Shepherd's Staff opens the lid of the Earth Grid by hooking into the swinging latch ring (26). It also props the lid up when it is open. The Shepherd's Staff grabs the Earth Separation Hook (28) to completely tip the Earth Grid forward on its face, thus allowing you to empty the contents of the Earth Grid. In Short, the Shepherd's Staff allows you to open, close, and empty the Earth Grid without ever having to bend over.

An individual with skill in the art may build upon the embodiments, concepts, designs, and apparatus herein, to create modifications and other apparatus similar in the method of decomposing organic matter. It is therefore construed that such similar apparatus and methods are of the same inherent nature and are obvious variations of the Earthgenuity System discussed herein. The following claim(s) shall be understood to include such modifications, methods, and apparatus of the Earthgenuity System.

The invention claimed is:

1. A method of composting using a three component composting apparatus comprising a first cylindrical receptacle for receiving organic waste; a second plastic bin for receiving waste from the first cylindrical receptacle; wherein said second plastic bin including a plurality of drain holes at the bottom; and a third bottomless square container including a cover atop said square container wherein said bottomless square container is divided into two duplicate grid sections for receiving drained waste from the second plastic bin, the method comprising the steps of:
   a) placing the first cylindrical receptacle indoors and collecting organic waste inside the first cylindrical receptacle;
   b) transferring the organic waste from the first cylindrical receptacle into the second plastic bin outdoors, wherein the organic waste drains fluids and is left to decompose into partially decomposed organic waste;
   c) removing the cover of the third bottom less square container and transferring the partially decomposed organic waste into said third bottomless square container located on the outdoors; wherein the third bottomless square container is placed on the ground and the partially decomposed organic waste continues to decompose into compost.

2. The method of claim 1, wherein the first cylindrical vessel further comprises a liquid tight top lid.

3. The method of claim 2, wherein the first cylindrical vessel further comprises a side handle located the side and a top handle on said lid of said cylindrical vessel.

4. The method of claim 2, wherein the first cylindrical vessel further comprises a foot pedal for opening and closing said top lid.

5. The method claim 2, wherein the second plastic bin comprises two wheels located at the bottom of said second plastic bin for transporting the second bin to said third bottomless square container.

6. The method of claim 5, wherein said second plastic bin further comprises a hinged liquid tight top lid.

7. The method of claim 6, wherein said second plastic bin further comprises a handle bar located at the top of said second plastic bin in alignment with said wheels located at the bottom of said second plastic bin.

8. The method of claim 2, wherein said third bottomless square container further comprises a top square covering lid including hinges on one side of said bottomless square container; said lid include four equally spaced rain holes including a mesh screen at the bottom said holes; a swing latch ring from said lid of said third bottomless square container for opening said lid utilizing a hook for opening and closing by a user from a standing position.

* * * * *

UNITED STATES PATENT AND TRADEMARK OFFICE
CERTIFICATE OF CORRECTION

PATENT NO. : 10,913,691 B2
APPLICATION NO. : 16/451672
DATED : February 9, 2021
INVENTOR(S) : Alexander Joseph Stokes Page 1 of 1

It is certified that error appears in the above-identified patent and that said Letters Patent is hereby corrected as shown below:

In the Claims

Column 8,
Claim 5, Line 1, delete "2" and insert --1--
Claim 8, Line 1, delete "2" and insert --1--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*